United States Patent [19]

Hirosawa et al.

[11] Patent Number: 5,465,354
[45] Date of Patent: Nov. 7, 1995

[54] METHOD AND APPARATUS FOR JOB EXECUTION PREDICTION AND CONTROL AND METHOD FOR JOB EXECUTION SITUATION DISPLAY

[75] Inventors: Toshio Hirosawa, Machida; Jun'ichi Kurihara, Matsuyama; Tsutomu Itoh, Kanagawa; Motohide Kokunishi, Kokubunji, all of Japan

[73] Assignee: Hitachi, Ltd., Tokyo, Japan

[21] Appl. No.: 31,593

[22] Filed: Mar. 15, 1993

[30] Foreign Application Priority Data

Mar. 19, 1992 [JP] Japan ................... 4-063058

[51] Int. Cl.$^6$ ................................. G06F 15/00
[52] U.S. Cl. ................... 395/650; 395/700; 364/DIG. 1; 364/280; 364/281.3; 364/281.4
[58] Field of Search ................... 395/650, 700; 364/DIG. 1, 281.3, 281.8, 271, 271.2, 271.3, 281, 280, 280.3, 280.4

[56] References Cited

U.S. PATENT DOCUMENTS 4,495,562  1/1985  Yamaji et al. .
5,283,897  2/1994  Georgiadis et al. ................... 395/650

OTHER PUBLICATIONS

"VOS3 Center Operation–Series JSS3–Hitachi Works HITAC Manual, 8091–3–001," pp. 18–24. (Japanese).
"Integrated Operation Management System HOPPS3 Summary, Hitachi Software Engineering HITAC Manual," pp. 35–36. (Japanese).
"One System for Performance Management in a Computer System and Experiment Using the Same," Transactions of the Institute of Information Processing, vol. 23, No. 6, Nov. 1982, pp. 591–597. (Japanese).
"VOS3 Manual for System Programmer–vol. Macro–Hitachi Works HITAC Manual," (Document No. 6180–3105), pp. 78–79. (Japanese).
"VOS 3 Manual for System Programmer–vol. Macro–Hitachi Works HITAC Manual," (Document No. 6180–3105), pp. 285–299. (Japanese).

*Primary Examiner*—Kevin A. Kriess
*Assistant Examiner*—Jonathan Hall Backenstose
*Attorney, Agent, or Firm*—Fay, Sharpe, Beall, Fagan, Minnich & McKee

[57] ABSTRACT

A job execution prediction control method and apparatus in a computer system having a CPU. Information on processing amounts of a plurality of parallelly executed jobs is collected during execution of the respective jobs. Predicted execution end times of the respective jobs are calculated on the basis of the collected information. Subsequent processing speeds of the respective jobs are controlled on the basis of the predicted execution end times calculated for the respective jobs and target execution end times of the respective jobs.

35 Claims, 10 Drawing Sheets

35 JOB SCHEDULING TABLE

| JOB NAME (35a) | PREDICTED CPU TIME (35b) | PREDICTED I/O COUNT (35c) | SCHEDULED JOB START TIME (35d) | SCHEDULED TARGET END TIME (35e) | PRIORITY JOB LIST (35f) | |
|---|---|---|---|---|---|---|
| JOB1 | 200 | 10000 | 18:00 | 19:00 | | |
| JOB2 | 300 | 15000 | 18:00 | 19:30 | | |
| JOB3 | 100 | 20000 | 19:00 | 20:00 | JOB1 | |
| JOB4 | 50 | 5000 | 19:30 | 20:00 | JOB2 | |
| JOB5 | 100 | 10000 | 20:00 | 21:00 | JOB3 | JOB4 |
| JOB6 | 10 | 5000 | 21:00 | 21:30 | JOB5 | |

FIG. 5

\* PREDICTED EXECUTION TIME    ¥ : TARGET END TIME

METHOD AND APPARATUS FOR JOB EXECUTION PREDICTION AND CONTROL AND METHOD FOR JOB EXECUTION SITUATION DISPLAY

BACKGROUND OF THE INVENTION

1. Field of the Invention

The present invention relates to a job execution control method and apparatus for a computer system which is capable of executing at least one job, and more particularly to a job execution prediction control method and apparatus for executing jobs in accordance with a job execution schedule set prior to the execution of the jobs, as well as a job execution situation display method.

2. Description of the Related Art

A job execution control method for a computer system in general tends to simultaneously execute a plurality of jobs with the development of a multi-programming control function of the operating system. However, if a large amount of jobs are to be executed at a time, the jobs may contend for limited resources of a computer system, thus incurring fear of degrading the performance of the computer system. As a method for solving this problem, a method has been devised, where jobs having similar processing characteristics are collected into a group (classification of jobs), and the execution of the jobs is controlled in the unit of the job class. According to this method, the number of simultaneously operated jobs can be limited to the number of classes. A job execution control using this method is described in "VOS3 Center Operation -Series JSS3- Hitachi Works HITAC Manual, 8091-3-001", pp 18–24. However, this method has a problem that, by setting classification of jobs and limiting the number of simultaneously executed jobs, a queue of execution waiting jobs is formed in each job class if jobs in the same class increases. This execution waiting queue is very troublesome for a job feeder. More specifically, if an execution waiting job queue exists at the time a job feeder has fed a Job, the feeder cannot know when the job is executed and when it will be ended. Among jobs, there are many which must be each started the execution at a predetermined time.

To solve this problem, a method has been devised for executing jobs according to a job schedule set prior to the execution of the jobs. In this method, an execution start time is previously set for each job, and a job schedule management program orderly executes the jobs at their set execution start times. This method is described in "Integrated Operation Management System HOPPS3 Summary, Hitachi Software Engineering HITAC Manual", pp 35–36. This method enables a job to start at a set time.

On the other hand, U.S. Pat. No. 4,495,562 shows a method which uses a processing history of a computer system to calculate an execution service rate (ESR), which is a performance index indicative of the processing speed of a job, and utilizes the ESR to determine to which computer the job is assigned in accordance with workloads of computers, thereby improving the throughput of the computer system. Incidentally, the definition of ESR is described in "One System for Performance Management in a Computer System and Experiment Using the Same", Transactions of the Institute of Information Processing, Vol. 23, No. 6, Nov. 1982, pp 591–597.

SUMMARY OF THE INVENTION

However, the job execution control method using a job schedule employs predicted execution times for the job scheduling based on the experience of the user, so that a job execution time differs depending on a workload of a computer system, thereby making the scheduling useless. Also, when two or more jobs are related to each other in a job group for which scheduling has been made, that is, when a subsequent job 2 cannot be executed unless a job 1, first started the execution, has been ended, the job 2 cannot be started even at an execution start time set for the job 2 if the job 1 has not been ended at that time. If a large number of such jobs related to each other are defined in a job scheduling, a delay of a particular job causes the whole job scheduling to be upset, with the result that the previously set job scheduling is useless.

On the other hand, in the above stated U.S. Pat. No. 4,495,562, since the ESR is calculated using an empirically calculated fixed value as an average input/output time required to one input/output operation, a precise job end time cannot be calculated. Also, U.S. Pat. No. 4,495,562 does not teach prediction of a job execution time or scheduling of jobs, but merely determines a computer to which a job to be next executed is assigned on the basis of the ESR thereof before the current job is ended.

It is therefore an object of the present invention to provide a job execution prediction control method and apparatus which are capable of removing the problems of the prior art, and a job execution situation display method.

It is another object of the present invention to provide a job execution prediction control method and apparatus for predicting a job execution time in consideration of fluctuations in workload of a computer system, and a job execution situation display method.

It is a further object of the present invention to provide a job execution prediction control method and apparatus which enable a job to be executed substantially in accordance with a schedule even if a workload of a computer system fluctuates, and a job execution situation display method.

According to one aspect of the present invention, a job execution prediction control method in a computer system having a CPU includes the steps of: collecting information on processing amounts of a plurality of parallelly executed jobs during execution of the respective jobs; calculating predicted execution end times of the respective jobs on the basis of the collected information; and controlling subsequent processing speeds of the respective jobs on the basis of the predicted execution end times calculated for the respective jobs and target execution end times of the respective jobs.

Preferably, when the predicted execution end time calculated for one of the jobs under execution is later than the target execution end time of the one job, the step of controlling the processing speeds increases the subsequent processing speed of the one job.

Preferably, when the predicted execution end time calculated for one of the jobs under execution is later than the target execution end time of the one job, the step of controlling the processing speeds sets the execution priority of the one job higher than the execution priorities of other jobs.

Preferably, the step of collecting information collects, as the information, a predicted consumed CPU time of a job under execution, a predicted consumed input/output time of the job, and a target elapsed time required to execute the job; and the step of calculating the predicted execution end times has the steps of: adding the predicted consumed CPU time of the job under execution to the predicted consumed input/output time of the job to derive a predicted processing amount of the job; dividing the predicted processing amount by the target elapsed time required to execute the job to derive a unit processing amount of the job; calculating a current unit processing amount of the computer system; and deriving a predicted execution end time of the job on the basis of the result of dividing the predicted processing amount of the job by the unit processing amount of the computer system for the jobs.

Preferably, for a job under execution or before execution, its own predicted execution end time may be recalculated on the basis of the results of other executed jobs or an executed portion of the job.

According to another aspect of the present invention, a job execution situation display method in a computer system having a CPU includes the steps of: collecting information on respective processing amounts of a plurality of parallelly executed jobs during the execution thereof; calculating predicted execution end times of the respective jobs on the basis of the collected information; and displaying on a time chart the predicted execution end times calculated for the respective job and target execution end times specified for the respective jobs.

In one example of the present invention, an input/output time per input/output operation of the CPU, i.e., a unit input/output time is calculated using a function which monotonously decreases as a predicted input/output count increases. Therefore, the unit input/output time can be predicted with a higher accuracy.

In one example of the job execution prediction control method according to the present invention, a predicted CPU time and a predicted input/output count of a job are defined as scheduling data for the job in addition to a start time and a scheduled end time of the job. After the execution of the job has been started, at the time a job step of the job to be scheduled is ended, an execution time and a CPU time of the job till the current time are collected as a processing history or logging of the job. Thereafter, this processing history is used to calculate the execution service rate ESR which indicates the processing speed of the job. Then, this ESR is used to predict an execution time required for an unexecuted portion of each job, i.e., a portion of the predicted CPU time and the predicted input/output count, defined as the scheduling data, from which the CPU time and the input/output count collected as the processing history are subtracted. As a result, if the predicted end time of the job to be scheduled exceeds the scheduled end time set as the scheduling data, the execution priority of the job is raised, or the execution of other jobs is temporarily interrupted so as to control the job to be executed in accordance with the schedule.

Since the job execution prediction control method is operated as a job in a computer system, it does not work when job scheduling control is not performed, thereby preventing the same from erroneously functioning for a conventional job execution control method.

DESCRIPTION OF THE PREFERRED EMBODIMENT

Figure 1:
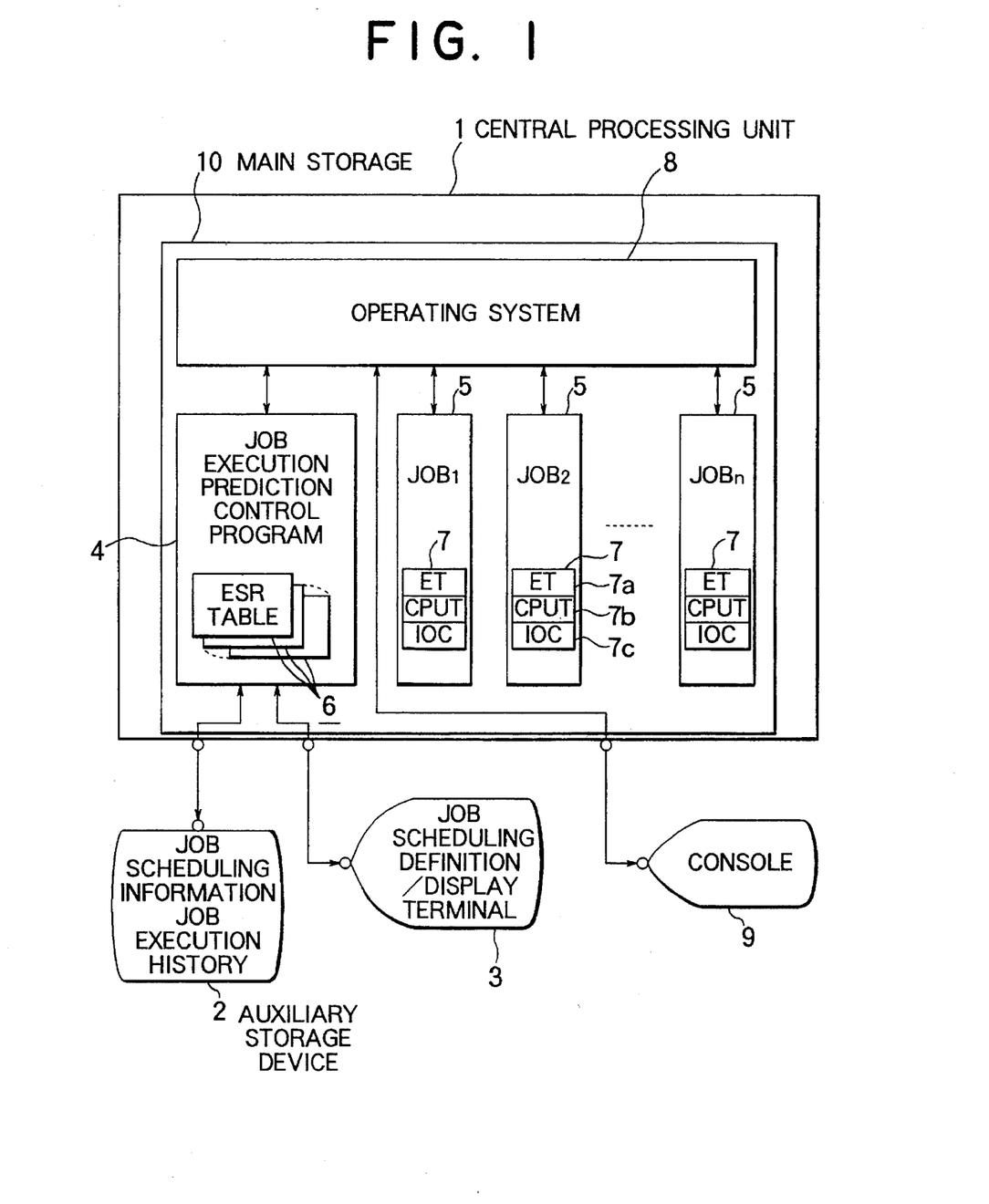
FIG. 1 is a block diagram showing the configuration of a computer system to which applied is a job execution prediction control method according to an embodiment of the present invention.

One embodiment of the present invention will hereinafter be described with reference to FIGS. 1–11. FIG. 1 shows the configuration of a computer system to which applied is a job execution prediction control method according to the embodiment of the present invention.

In addition to a conventional computer system having a central processing unit 1 including a main storage 10; a console 9 for handling an operating system (OS) 8 for simultaneously executing at least one job 5 which operates on the central processing unit 1; an auxiliary storage device 2 for storing job scheduling information and a job execution history; and a terminal 3 for performing schedule definition and display of jobs, the computer system of this embodiment is provided with a job execution prediction control program 4 including a job execution prediction control method according to this embodiment in the central processing unit 1. It should be noted that the job execution prediction control program 4, jobs 5 and the OS 8 may be stored in the main storage 10.

In this embodiment, the job execution prediction control program 4 for realizing the job execution prediction control method of this embodiment operates as a job under the control of the operating system 8. Alternatively, the program 4 may be incorporated in the operating system 8. The job execution prediction control program 4 comprises a plurality of tables (ESR tables) 6 for storing job scheduling information and an execution history. Each of the jobs 5 comprises accounting information 7 thereof. The accounting information 7 includes an elapsed time (ET) 7a from the beginning of job execution; a used CPU time (CPUT (a time for which the performance of the CPU (central processing unit) is used)) 7b; and an input/output (I/O) count (IOC) 7c.

Figure 2:
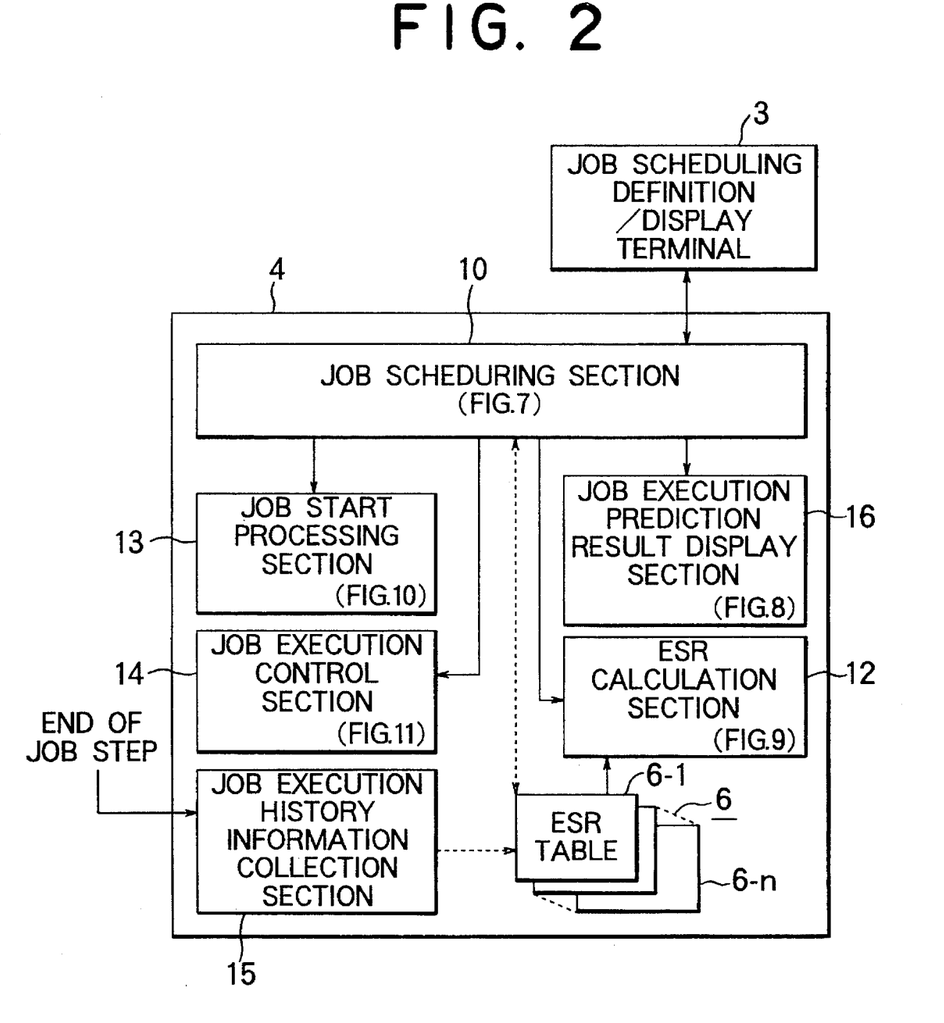
FIG. 2 is a block diagram showing the configuration of a job execution prediction control program of FIG. 1.

FIG. 2 shows in detail the configuration of the job execution prediction control program 4 of the present invention. The job execution prediction control program 4 is made up of a job scheduling section 10; a job execution prediction result display section 16; an ESR calculation section 12; a job initialization processing section 13; a job execution control section 14; and a job execution history information collection section 15. The job execution prediction control program 4 comprises a plurality of ESR tables 6 for storing scheduling information and an execution history for each job. The tables 6 are provided for the respective jobs to be scheduled, so that if the number of jobs is n, tables 6-1 to 6-n are provided.

Figure 3:
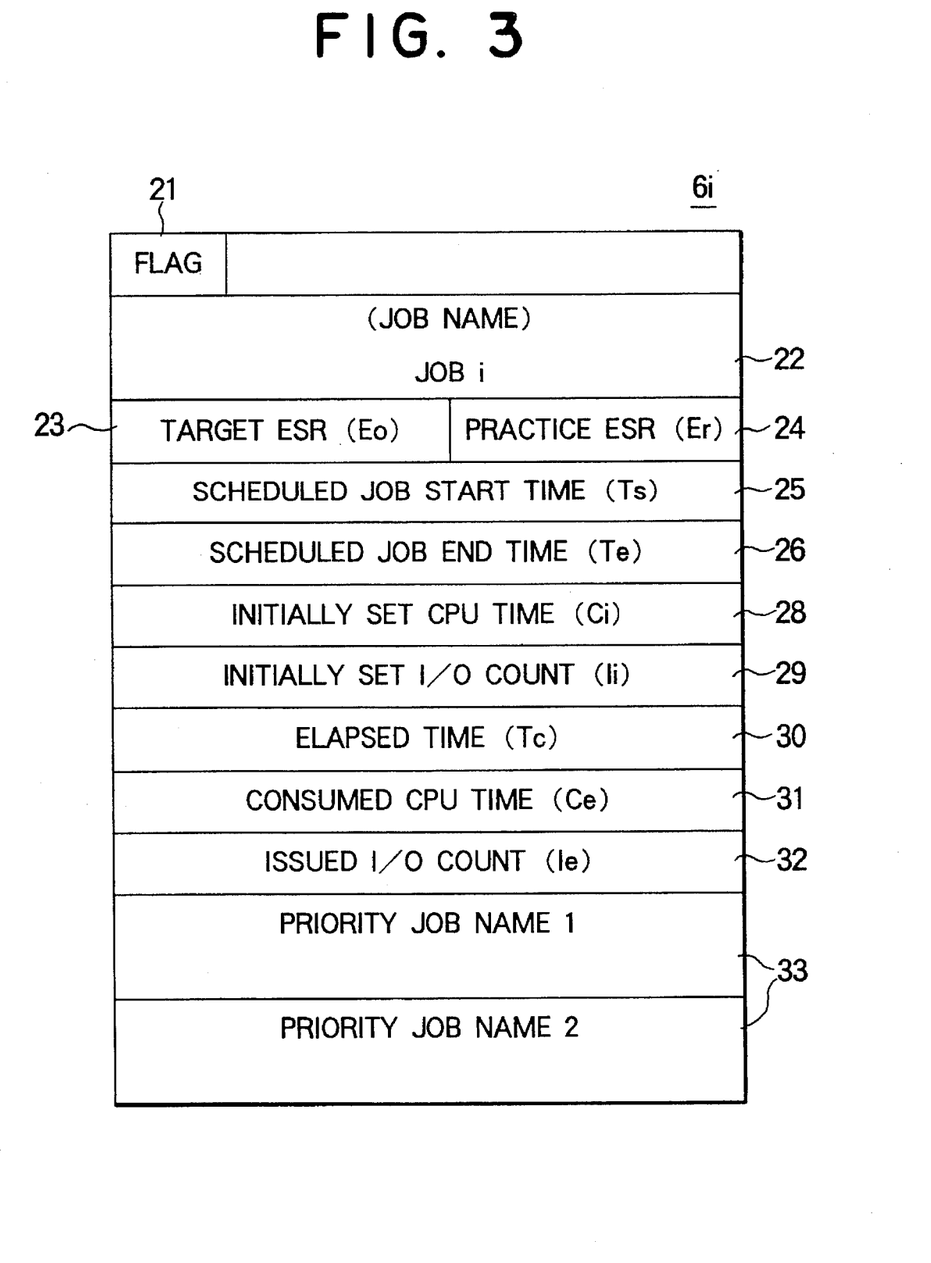
FIG. 3 is a diagram showing the structure of an ESR table for storing execution prediction data for a job.

FIG. 3 shows the structure of the ESR table $6i$ (a table for the $i^{th}$ job in this example). The ESR table $6i$ is made up of a status flag 21 representing an execution status of the job i; a region 22 for storing the job name (JOBi) of a job to be scheduled; a region 23 for storing a target ESR (Eo) which is an index representing an execution speed for ending the job i within a defined time; a region 24 for storing a practice ESR (Er) which is an execution speed when the job i is actually executed; a region 25 for storing a scheduled start time (Ts) of the job i; a region 26 for storing a scheduled end time (Te) of the job i; a region 28 for storing a CPU time (Ci) for the job i which has been initially set upon defining the schedule for the job i; a region 29 for storing an I/O count (Ii) set upon defining the schedule for the job i; a region 30 for storing an elapsed time (Tc) from the beginning of the execution of the job i; a region 31 for storing a consumed CPU time (Ce) from the beginning of the execution of the job i; a region 32 for storing an issued I/O count (Ie) from the beginning of the execution of the job i; and a region 33 for storing names of related jobs among jobs to be scheduled which must have been ended the execution thereof for executing the job i (priority job names).

Figure 4:
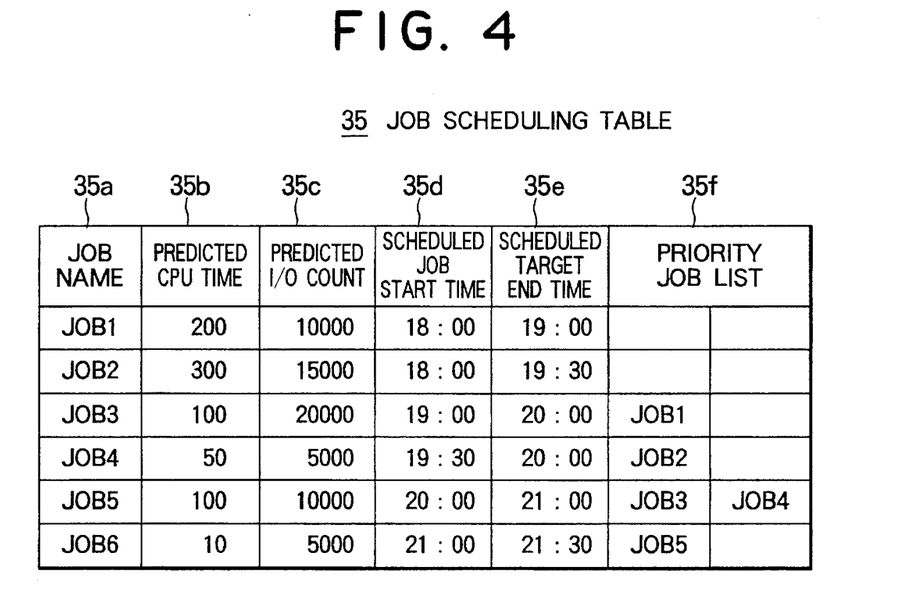
FIG. 4 shows an example of job scheduling data definition.

FIG. 4 is a definition table for a job stored in the job scheduling section 10. This table defines, as scheduling information for a job, the name of the job 35a; a predicted CPU time 35b; a predicted I/O count 35c; a scheduled start time 35d and a target end time 35e of the job; and a list 35f of jobs (priority job names) which must have been ended prior to the beginning of the job. Data in this table is defined by inputting the above information from an input terminal (e.g., a keyboard) of the job scheduling definition/display terminal 3 of FIG. 1. In the illustrated example, schedules for six jobs JOB1–JOB6 are defined. JOB1 is scheduled to start the execution at 18:00 and end by 19:00. Similarly, JOB2 is scheduled to start the execution at 18:00 and end by 19:30. JOB3 is scheduled to start the execution at 19:00 and end by 20:00. Note that JOB3 cannot be executed unless the execution of JOB1 has been ended. Similarly, JOB4 can be executed only after the execution of JOB2 has been ended; JOB5 after JOB3 and JOB4; and JOB6 after JOB5.

Figure 5:
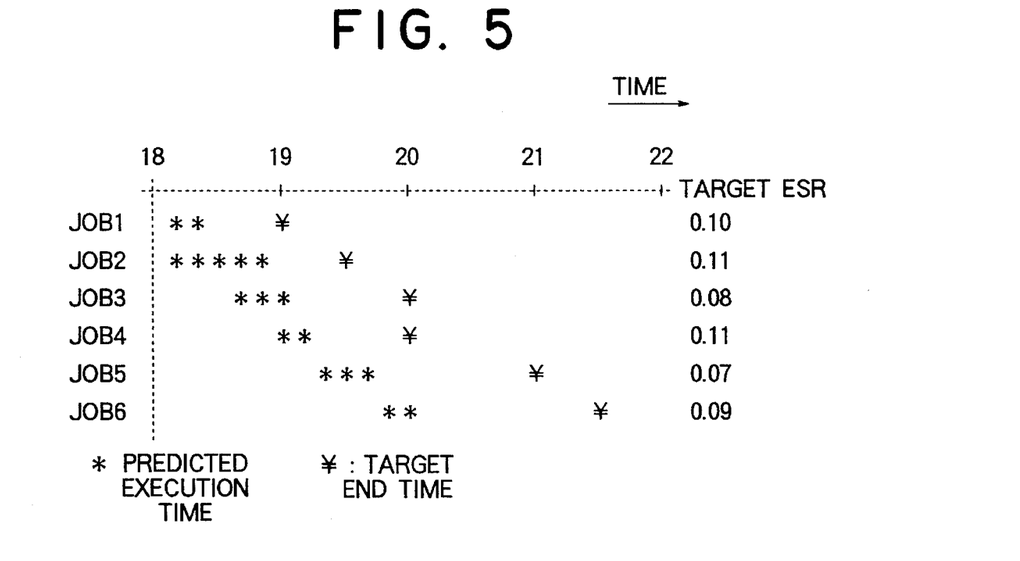
FIG. 5 is a diagram showing a time chart of exemplary job execution prediction results.

FIG. 5 is a chart showing JOB execution prediction results calculated on the basis of the job scheduling information of FIG. 4, as will be later described. The abscissa represents the time. For example, 18 represents 18 o'clock 00 minute. A symbol "¥" in the figure represents a target end time of a job defined in the job scheduling table of FIG. 4; a symbol "*" represents a predicted execution time required for an unexecuted portion of the job which is predicted from a current workload state of the computer by the job execution prediction control program 4. Suppose that one symbol "*" corresponds to ten minutes in this example. This time chart is displayed, for example, on a display screen of the job scheduling definition/display terminal 3 of FIG. 1 by the job execution prediction control program 4.

Figure 6:
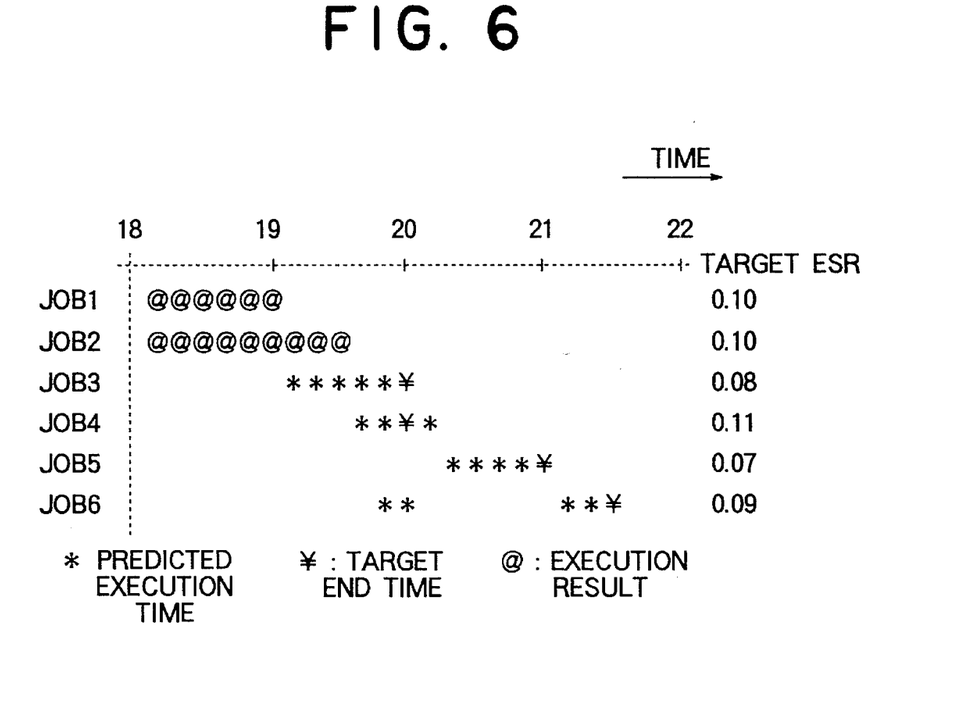
FIG. 6 is shows a time chart of job execution prediction results in which the prediction is recalculated each time a job is ended.

FIG. 6 shows a job time chart similar to FIG. 5. However, the time chart of FIG. 6 differs from that of FIG. 5 in that FIG. 6 further displays the results of jobs after execution. In this example, predicted execution times of respective JOB3–JOB6 are recalculated and displayed at the time JOB1 and JOB2 have been ended. A symbol "@" in the figure represents a unit execution time of a job which has been executed. It can be seen that the execution of JOB 1 takes 60 minutes while the execution of JOB2 takes 90 minutes. Here, since JOB4 cannot starts its execution unless JOB2 has been ended (see the priority job list in FIG. 4), a predicted execution time of JOB 4 is recalculated at the time the execution of JOB2 has been ended. The result shows that a predicted end time of JOB4 will exceed the target end time 20:00. One feature of this embodiment is to realize a control method which is effective when the result of predicting a job execution time indicates that a predicted end time exceeds a target end time of a job, to increase the processing speed of the job such that an actual end time of the job approaches to the target end time. This control method will be explained later.

Figure 7:
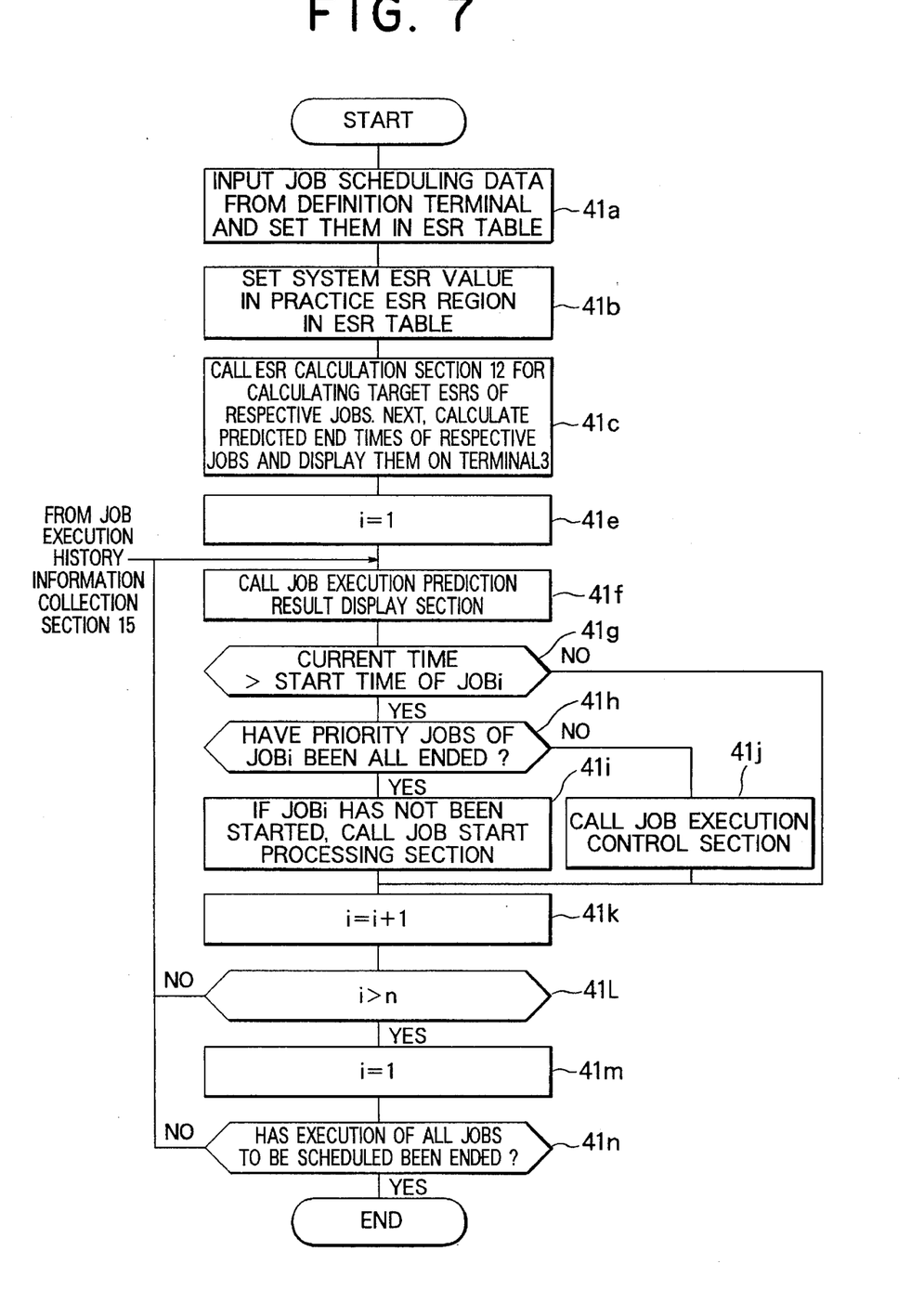
FIG. 7 is a flow chart showing the processing of a job scheduling section of FIG. 2.
Figure 8:
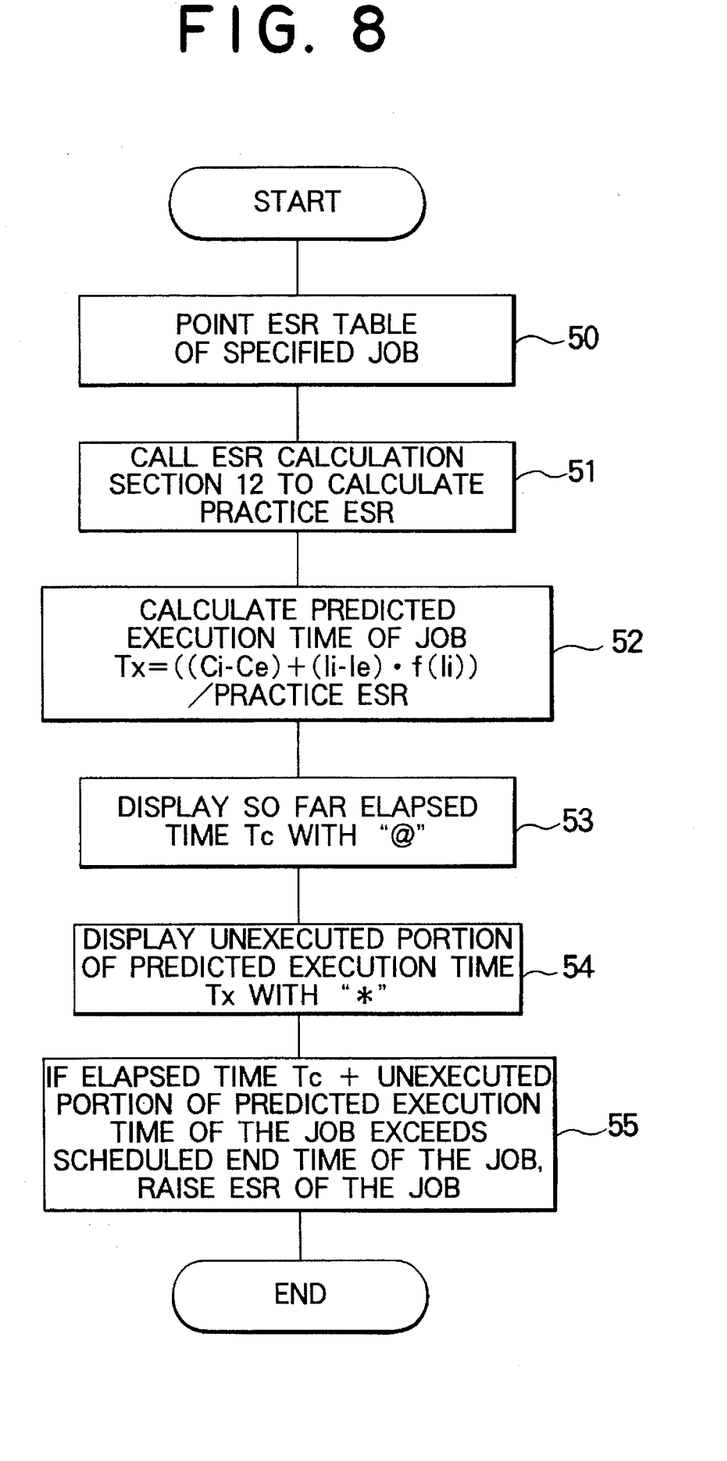
FIG. 8 is a flow chart showing the processing of a job execution prediction result display section of FIG. 2.
Figure 9:
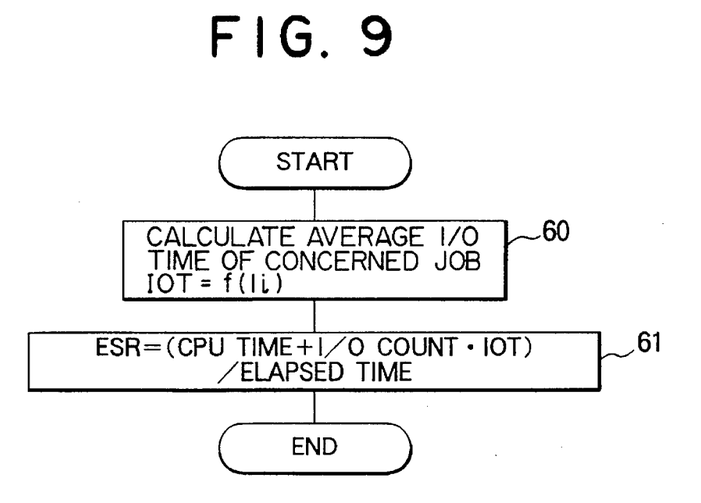
FIG. 9 is a flow chart showing the processing of an ESR calculation section of FIG. 2.
Figure 10:
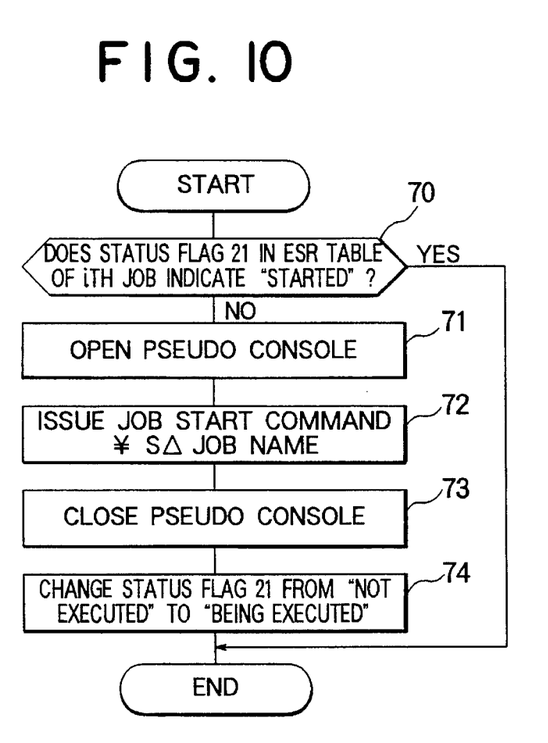
FIG. 10 is a flow chart showing the processing of a job initialization processing section of FIG. 2.

The processing of this embodiment will be shown below in greater detail. FIGS. 7–11 show processing flows of main sections of the job execution prediction control program 4 of FIG. 2. Specifically, FIG. 7 shows a processing flow of the job scheduling section 10; FIG. 8 a processing flow of the job execution result display section 11; FIG. 9 a processing flow of the ESR calculation section 12; FIG. 10 a processing flow of the job initialization processing section 13; and FIG. 11 a processing flow of raising the execution priority of a job in the job execution control section 14.

In this embodiment, the job execution prediction control program 4 is started as a job by feeding a START command, which is an OS command, from the console 9 of FIG. 1. When the job execution prediction control program 4 is started, the control is first passed from the operating system 8 to the job scheduling section 10.

Referring to FIG. 7, When the control is passed to the job scheduling section 10, scheduling data for each job shown in the job scheduling table 35 of FIG. 4 is inputted from the terminal 3, and the data is stored in the ESR tables 3 corresponding to the jobs shown in FIG. 1 or FIG. 3 at processing step 41a. Specifically, among the job scheduling data in the table 35, the job name 35a of each job is stored in the job name region 22; the CPU time 35b in the initially set CPU time region 28; the I/O count 35c in the initially set I/O count region 29; the job start time 35d in the job start time region 25; and the job end time 35e in the job end time region 26.

At the next processing step 41b, an ESR value of the system, for example, is stored in the practice ESR region 24 in the ESR table 6 as an initial value. It will be understood that another arbitrary value may be stored as an initial value.

The ESR of each job is an index which indicates the processing speed of the job, i.e., a unit processing amount of the job, and is defined by Equation (1). Detail of the ESR is shown in the aforementioned Transaction of the Institute of Information Processing.

$$ESR = \frac{CPU \text{ Time} + \text{Input/Output Time}}{\text{Elapsed Time}} \quad (1)$$

The input/output time is calculated by multiplying an average value of the input/output time required to one input/output operation (average input/output time) with the I/O count 35c in the job scheduling table 35. A conventional ESR calculation method has used a fixed value (e.g., 30 msec) for an average input/output time per input/output operation. In the present invention, the average input/output time per input/output operation (unit input/output time) is modified depending on the I/O count in the equation for calculation the input/output time shown in Equation (1). This embodiment employs the following Equation (2) derived from actual measurement data as a function for calculating the average input/output time f(x):

$$f(x) = (A-B) \cdot \exp(-\alpha \cdot \log(X/X_0)) \quad (2)$$

Stated another way, in the present invention, it was empirically found that the average input/output time is not constant but monotonously decreases with an increase of the I/O count (particularly in sequential processing of jobs), and this fact was represented by an equation. In Equation (2), X represents an I/O count of a job; $X_0$ a minimum I/O count of the job; A an average I/O time with the I/O count up to $X_0$; B an average I/O time with an infinite I/O count; and $\alpha$ a decrease coefficient. In this embodiment, $X_0$ is set to 100; A to 100 msec; B to 5 msec; and $\alpha$ to 2.3. Incidentally, these parameters may be set to values depending on the characteristic of the job.

This embodiment uses an average value of ESRs of respective jobs calculated from the execution histories of previously executed jobs, i.e., a unit processing amount of the entire system as the ESR of a practicable job upon prediction (system ESR). As an alternative method, a reference job is constantly operated, and its practice ESR value may be used as the system ESR.

At processing step 41c, the ESR calculation section 12 is called for calculating target ESRs of the respective jobs. The target ESR means an ESR required to end the job within a scheduled elapsed time from a scheduled start time to a scheduled end time.

FIG. 9 is a processing flow of the ESR calculation section 12 which is called from processing step 41c of FIG. 7 and processing step 51 of FIG. 8. At processing step 60, an average I/O time (IOT) of a job is calculated by Equation (2). At processing step 61, the ESR of the job is calculated by Equation (1). The ESR calculation section 12, when called from processing step 41c of FIG. 7, uses, for calculating the target ESR (Eo), the initially set CPU time (Ci) 28 in the ESR table of the job as a CPU time, i.e., a predicted consumed CPU time; uses the initially set I/O count (Ii) 29 as an I/O count of the job, i.e., a predicted consumed I/O count; and uses the difference between the scheduled job end time (Te) 30 and the scheduled job start time (Ts) 25 as an elapsed time. Also, for calculating the practice ESR (Er) 24, the ESR calculation section 12 uses the consumed CPU time (Ce) 31 as a CPU time, and uses the issued I/O count (Ie) 32 for calculating an I/O time. Next, the calculated ESR is stored in the target ESR region 23. In the example shown in FIG. 4, the target ESR for starting JOB1 at 18:00 and ending the same at 19:00 is 0.10. Similarly, the target ESR for ending JOB2 at 19:30 is 0.11.

At processing step 41c, a predicted execution time (Tn) of the job is calculated, and the result is displayed on the terminal 3. An example of the display is shown in FIG. 5. The predicted execution time of the job indicated by the symbols "*" in FIG. 5 was calculated on the assumption that a practicable ESR of the job at the time of the prediction was 0.2. Therefore, the predicted execution time (Tn) of JOB1 is calculated to be 30 minutes from Equation (3):

$$Tn = (Ci + f(Ii) \times Ii)/\text{System ESR} \quad (3)$$

where $f(Ii) \times Ii$ represents a predicted consumed input/output time of the job.

Similarly to JOB1, Equation (3) is used to calculate the predicted execution time (Tn) for JOB2–JOB6, and the results are displayed. In other words, the processing from processing step 41a to processing step 41c of FIG. 7 is repeated a number of times equal to the number of jobs registered in FIG. 4 (e.g., six). Incidentally, FIG. 7 omits a processing flow of the repetition processing for calculating and displaying the predicted execution time of each job at this initial state. It will be understood that the predicted execution end time is calculated by the predicted start time plus Tn.

At processing step 41e, a count i on a counter (e.g., a soft counter of the job scheduling section 10) is initialized to one. That is, initial setting of the ESR tables 6 is completed by processing steps 41a–41e.

Afterward, processing steps 41f to 41n are repeatedly executed until the execution of all the jobs is ended. Here, a letter "n" in FIG. 7 indicates a number of jobs to be scheduled; and i the $i^{th}$ job in the n jobs. In processing step 41f of the processing flow of the job scheduling section 10 shown in FIG. 7, every time this job step is ended in each job, the control is passed without fail from the operating system 8. Specifically, in response to the job step being ended, the control is passed from the job execution history collection section 15 shown in FIG. 2. A method of passing the control from the job execution history information collection section 15 will be later explained.

At processing step 41f, the job execution prediction result display section 16 (FIG. 2) is called for displaying the time chart illustrated in FIG. 5 showing the predicted job execution times.

The execution prediction result display section 16 called from processing step 41f points the $i^{th}$ ESR table 6i at processing step 50, as shown in FIG. 8. At processing step 51, the ESR calculation section 12 is called to calculate the practice ESR for the $i^{th}$ job (JOBi). The ESR calculation section 12, when called from this processing step 51, uses the consumed CPU time (Ce) 31 of JOBi as a CPU time; and uses the issued I/O count (Ie) 32 as to JOBi for calculating the practice ESR for the $i^{th}$ job JOBi in accordance with the processings of FIG. 9. At processing step 52, a predicted execution time (Tx) for an unexecuted portion is calculated by Equation (4) from the practice ESR (Er) 24 and the initially set CPU time (Ci) 28 calculated at processing step 51, the initially set I/O count (Ii) 29, the consumed CPU time (Ce) 31, and the issued I/O count (Ie) 32:

$$Tx = (Ci - Ce) + (Ii - Ie) \cdot f(Ii))/\text{Practice ESR} \quad (4)$$

At processing steps 53 and 54, an elapsed time (Tc) from the start of the execution of a job to the current time is displayed with the symbol "@" on the terminal 3, and the predicted execution time (Tx) for the unexecuted portion is displayed with the symbol "*". FIG. 6 shows an example of such displays. If Ce and Ie of the job are both zero, the symbol "@" is not displayed as shown in FIG. 5. At the next processing step 55, if the current time is determined to exceed the scheduled execution start time of the $i^{th}$ job, the job execution control section 14 is called to increase the execution speed of the job, and the execution priority of the job is raised. Specifically, the execution priority is changed from 100 to 101. Details of this processing will be explained in connection with processing step 41j of FIG. 7. Alternatively, when the predicted execution end time of a job exceeds the target execution end time of the job, the execution priority of the job may be raised. The control section 14 manages the execution priorities of the respective jobs.

At processing steps 41g and 41h, the current time is compared with the execution start time of the $i^{th}$ job JOBi, and if the current time exceeds the execution start time of the job (JOBi) and if the execution of all jobs having higher priorities than the job (JOBi) has been ended, the job start processing section 13 (FIG. 2) is called at processing step 41i for starting the $i^{th}$ job. FIG. 10 shows a processing flow of the job start processing section 13. In FIG. 10, when the job start processing section 13 is called, a check is first made at processing step 70 whether or not the $i^{th}$ job JOBi has already been started. Since the status of JOBi (not executed, being executed or execution ended) is managed by the status flag 21 (FIG. 3) in the corresponding ESR table 6i, the determination is made from this flag. If JOBi has been started (being executed or has been executed), no processing is performed.

Conversely, if JOBi has not been started, i.e., before execution, a pseudo console is opened at processing step 71. The pseudo console is an interface for issuing a variety of control commands from the job execution control program 4 to the operating system 8, details of which are disclosed by the following publication: "VOS3 Manual for System Programmer -Vol. Macro- Hitachi Works HITAC Manual" (Document Number 6180-3105, pp 285–299).

At processing step 72, by issuing a job start command (¥S command) ¥SΔ Job Name which uses as a parameter the job name of JOBi specified at processing step 41$i$ of the job scheduling section 10 shown in FIG. 7, JOBi is started by the operating system 8. After JOBi has been started, the pseudo console is closed at processing step 72. Further, at processing step 74, the status flag 21 is changed from "not executed" to "being executed". When the execution of JOBi is ended, the status flag 21 is changed to "execution ended", and the counted value i of the counter is incremented by one to indicate i+1 at processing step 41$k$. Then, at processing step 41L, determination is made whether or not i>n is satisfied. If i>n is not satisfied, processing steps 41$f$–41L are executed for the next job.

Referring again to FIG. 7, if the current time is determined to exceed the execution start time of the $i^{th}$ job at processing step 41$g$ but if determination is made at processing step 41$h$ that the execution of a job having priority to the $i^{th}$ job has not been ended, the job execution control section 14 is called at processing step 41$j$ for increasing the execution speed of the priority job, and the execution priority of the job is changed, for example, from 100 to 101. In this event, it is assumed that the execution priority 100 is a standard priority, while 101 is a high priority, and all other jobs are given the priority equal to 100.

Figure 11:
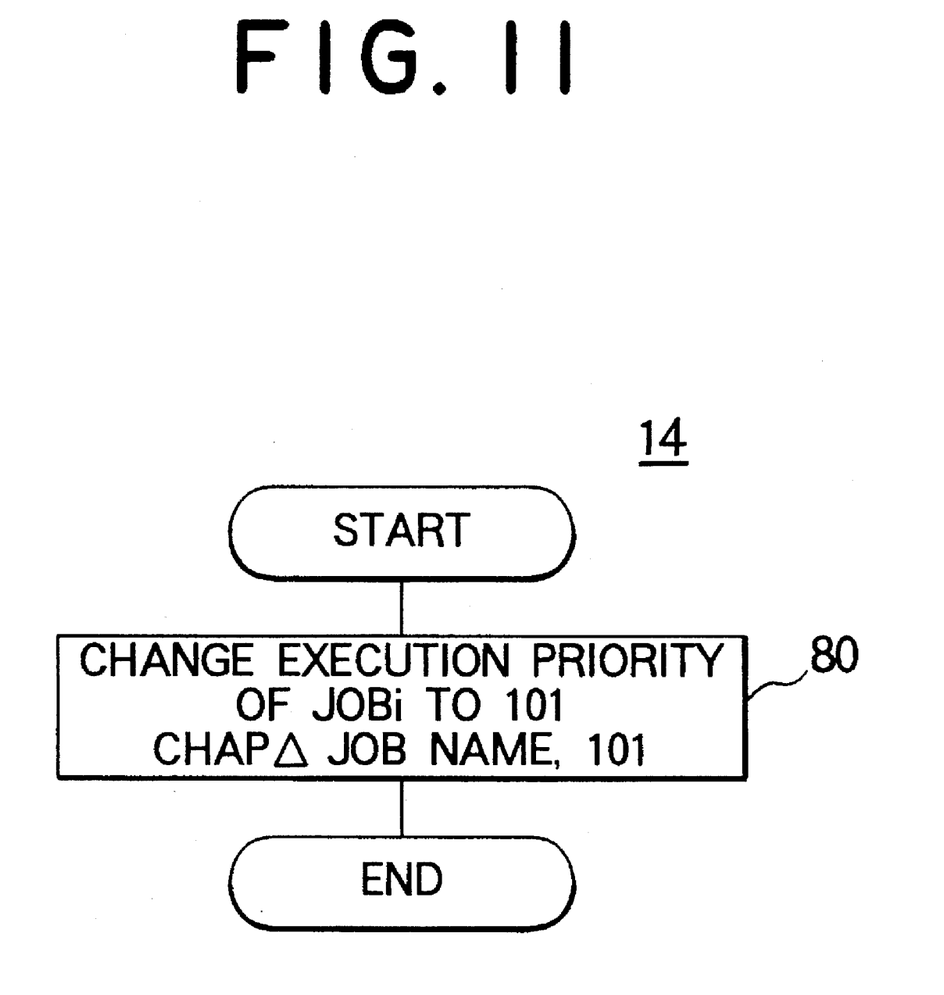
FIG. 11 is a flow chart showing the processing of raising the execution priority of a job in a job execution control section of FIG. 2.

FIG. 11 shows a processing flow of the processing for raising the execution priority of a job executed by the job execution control section 14. At processing step 80, CHAP (change priority) macro (CHAPΔ Job Name, 101) is used for indicating that the execution priority of a job step is to be changed, and the execution priority of the currently executed job step is changed within a job step group including a specified job. Details of the CHP macro is disclosed in "VOS3 Manual for System Programmer -Vol. Macro- Hitachi Works HITAC Manual" (Document Number 6180-3105, pp 78–79).

In this manner, when a predicted execution time of a job exceeds the target end time of the job, as indicated by JOB4 in FIG. 6, the ESR representing the processing speed of the job is increased since the CPU time is preferentially allocated to the job, and consequently the execution end time of the job becomes earlier.

The foregoing processing (from processing step 41$f$ to processing step 41L) is repeatedly performed for all jobs, i.e., until i>n is satisfied.

Subsequent to the above processing, when i>n is determined at processing step 41L, the count i is initialized to one at processing step 41$m$, and then it is checked at processing step 41$n$ whether all jobs to be scheduled shown in FIG. 4 have been ended, i.e., whether unprocessed jobs exist. If all such jobs have not been ended, the processing flow returns to processing step 41$f$ to execute the unprocessed jobs. Conversely, if all the jobs have been ended, the processing program realizing the job execution prediction control method of this embodiment is ended.

When there is no job which can be started, or when there is no job, the scheduled start time of which has reached, a predicted end time is recalculated for an unexecuted job or a currently executed job, preferably based on histories of so far executed jobs. This recalculation may be performed at predetermined time intervals or every time the execution of a job is ended.

Prior to explanation of the recalculation, the job execution history information collection section 15 will be described. The job execution history collection section 15 receives the control passed from the operating system 8 upon ending job steps of a job to be scheduled. Generally, a job is made up of at least one job step.

The job execution history information collection section 15 is started every time one job step of a job to be scheduled is ended, and an elapsed time, a consumed CPU time and an I/O count of the job are obtained from the job accounting information 7 shown in FIG. 1 through the operating system 8, and stored in the ESR table 6 which is prepared corresponding to the job. For collecting the consumed CPU time and the I/O count, a method disclosed in U.S. Pat. No. 4,495,562 may be used.

The job scheduling section 10 recalculates the predicted end time for a job before execution or under execution. Specifically, in FIG. 7, if a job under execution exists (processing step 41$n$), or if the execution of a job is ended (processing step 41$k$), the processing flow again returns to processing step 41$f$ to call the job execution prediction display section 16. This display section, as has been explained, performs the processing shown in FIG. 8. The processing of FIG. 8 in this case is identical to the previously described one, and as a result information shown in FIG. 6 is always displayed on the terminal 3. In this event, if the predicted execution time is recalculated for an unexecuted job, an average value of ESRs of previously executed jobs calculated from execution histories of the jobs is used as the system ESR in Equation (3). In this manner, the accuracy of the predicted execution time is improved for the unexecuted job. The recalculation of the predicted execution time of a job under execution may be performed by using Equation (4).

The foregoing is one embodiment of the job execution prediction control method according to the present invention. While in this embodiment, the job scheduling data shown in FIG. 4 is inputted from the terminal 3, schedule data previously stored in the auxiliary storage device may be inputted.

Figure 12:
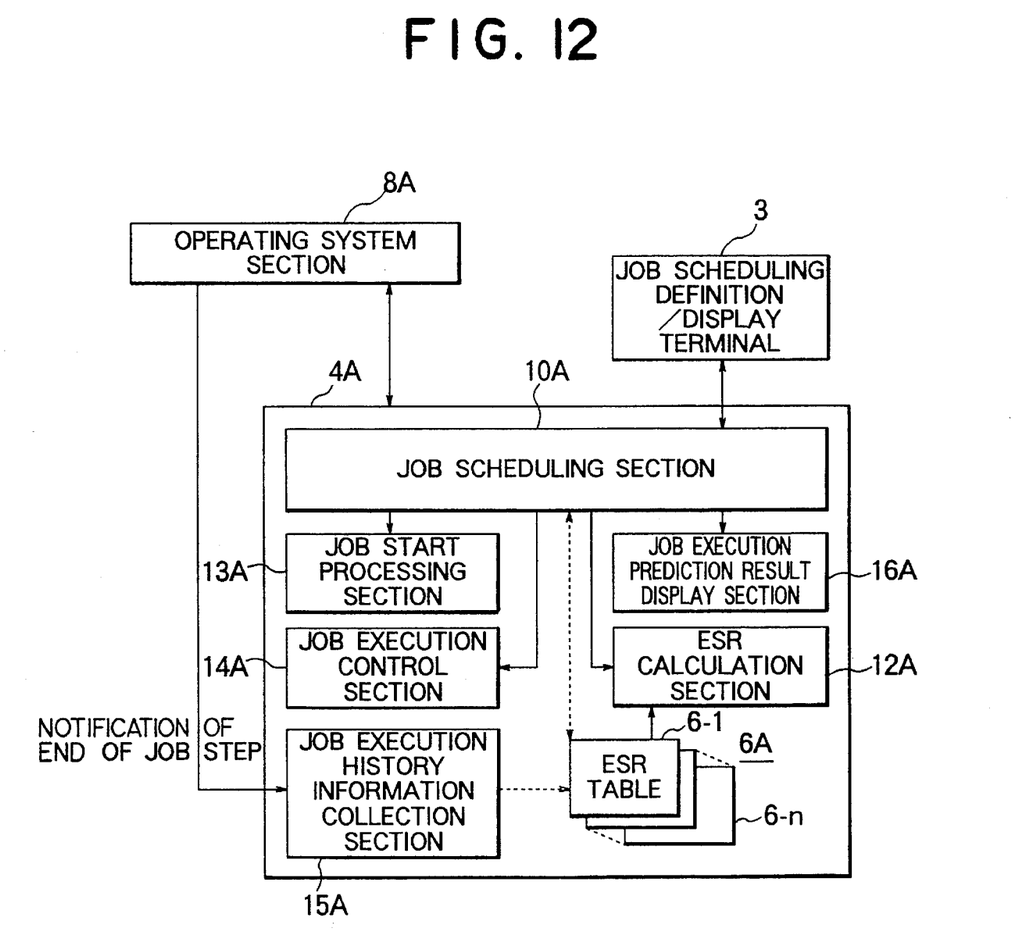
FIG. 12 is a block diagram showing the configuration of the job execution prediction control section when the embodiment shown in FIGS. 1, 2 is implemented by hardware.

In the above described embodiment, the job execution prediction control section is implemented by a program as shown in FIG. 2. Alternatively, the respective program sections 10–16 of FIG. 2 may be implemented by hardware logics, in which case the configuration may be as shown in FIG. 12. In FIG. 12, constituents having the same functions as those in FIG. 2 are designated the same reference numerals. In this case, the operating system 8 of FIG. 1 may also be implemented by hardware.

According to the present invention, a CPU time, an I/O count and an elapsed time of a job are periodically monitored to calculate the ESR which is an index representing the execution speed of the job, thereby making it possible to predict an execution time of an unexecuted portion of the job, inform the job feeder of an end time of the job which may fluctuate depending on a workload of the computer system, and clarify a scheduled job end time which has conventionally been obtained in an empirical manner.

Further, by predicting an execution time of a job, if a predicted end time of the job happens to be later than a target end time, any measures can be taken for increasing the processing speed of the job, whereby the influence of a delay in the execution of a particular job exerted on other jobs can be limited within a previously set job scheduling, compared with the prior art methods.

What is claimed is:

1. An execution and prediction and control method of a plurality of jobs executed in parallel in a computer system having a CPU and display means, comprising the computer-executed steps of:

a) obtaining target excution end times of said plurality of jobs to be executed in parallel and outputting the target execution end times to said display means, wherein said target execution end times are obtained from at least one of a user terminal, a calculated value, and an associated auxiliary storage device;

b) collecting information of historical data including run time data on processing amounts of a plurality of jobs during execution of said plurality of jobs;

c) obtaining, using said collected information of historical data, predicted execution end times of said plurality of jobs being executed;

d) comparing the predicted execution end times obtained for said plurality of jobs with the target execution end times of said plurality of jobs; and e) controlling subsequent execution priorities of said plurality of jobs in accordance with results of the comparisons, respectively, so that the target execution end times of said plurality of jobs can be best achieved.

2. A job execution and prediction and control method according to claim 1, wherein said step of controlling the processing speeds, when the predicted execution end time calculated for one of said jobs under execution is later than the target execution end time of said one job, increases the subsequent processing speed of said one job.

3. A job execution and prediction and control method according to claim 1, wherein said step of controlling the processing speeds, when the predicted execution end time calculated for one of said jobs under execution is later than the target execution end time of said one job, sets the execution priority of said one job higher than the execution priorities of other jobs to thereby increase the processing speed of said one job.

4. A job execution and prediction and control method according to claim 1, wherein said step of collecting information collects, as said information, a predicted consumed CPU time of a job under execution, a predicted consumed input/output time of said job, and a target elapsed time required to execute said job; and said step of calculating the predicted execution end times includes the steps of:

adding the predicted consumed CPU time of said job under execution to the predicted consumed input/output time of said job to derive a predicted processing amount of said job;

dividing the predicted processing amount by the target elapsed time required to execute said job to derive a unit processing amount of said job;

calculating a current unit processing amount of said computer system; and deriving a predicted execution end time of said job in accordance with a result of dividing the predicted processing amount of said job by the unit processing amount of said computer system for the jobs.

5. A job execution and prediction and control method according to claim 4, wherein said predicted consumed input/output time of said job is calculated by multiplying the predicted input/output count by the unit input/output time of said job.

6. A job execution and prediction and control method according to claim 4, wherein said input/output time is calculated using a function which monotonously decreases as the predicted input/output count increases.

7. A job execution and prediction and control method according to claim 1, wherein:

said step of collecting information collects, as said information, a predicted consumed CPU time of said job, a predicted consumed input/output time of said job, and a target execution end time of said job; and said step of calculating the predicted execution end times includes the steps of:

adding the predicted consumed CPU time of said job to the predicted consumed input/output time of said job to derive a predicted processing amount of said job;

dividing the predicted processing amount by a target elapsed time of said job derived from the target execution end time of said job to derive a unit processing amount of said job;

calculating a unit processing amount of jobs, the execution of which has been ended at a current time; and recalculating the predicted execution end time of said job, during the execution or before the end of the execution of said job, in accordance with the result of dividing the predicted processing amount of said jobs, the execution of which has been ended at the current time.

8. A job execution and prediction and control method according to claim 1, wherein the predicted execution end time calculated for a job under execution is displayed on display means.

9. A job execution and prediction and control method according to claim 1, wherein said step of collecting information collects, as said information, upon collecting the processing amount, an execution time, a consumed CPU time and an input/output count until the time at which the processing amount of said job under execution is collected.

10. A job execution and prediction and control method according to claim 1, wherein said step of collecting information collects, as said information, the processing amount of said job under execution upon ending a job step of said job under execution.

11. A job execution and prediction and control method according to claim 1, wherein:

a predicted CPU time and a predicted input/output count of said job are set prior to the execution of said job; and a processing amount under execution of said job and said set values are used to predict an execution end time of said job upon predicting an execution time of said job.

12. A job execution and prediction and control method according to claim 1, wherein an input/output time per input/output operation is determined in accordance with the input/output count of said job under execution and multiplied with a predicted input/output count of said job to predict the entire input/output time of said job.

13. A job execution and prediction and control method according to claim 1, wherein the unit processing amount of said computer system is an average value of the unit processing amounts of so far executed jobs.

14. A job execution and prediction and control method according to claim 1, wherein the unit processing amount of said computer system is a unit processing amount of a reference job.

15. A job execution and prediction and control method according to claim 1, wherein predicted execution times required to complete the execution of the respective jobs are derived in course of the execution of the respective jobs, and predicted end times of the jobs are calculated using the predicted execution times.

16. An execution prediction and control method according to claim 1, wherein:

said step a) includes a step of obtaining said target execution end time of each of said plurality of jobs by dividing an initially set processing amount of said each said plurality of jobs, which is a sum of an initially set CPU time of said each of said plurality of jobs and an initially set input/output time of said each of said plurality of jobs, by a unit processing amount of said computer system.

17. An execution prediction and control method according to claim 16, wherein:

said step a) includes a step of obtaining said initially set input/output time of said each of said plurality of jobs by multiplying an initially set input/output count of said each of said plurality of jobs by a unit input/output time of said each of said plurality of jobs, and wherein said unit input/output time of said each of said plurality of jobs decreases monotonously as said initially set input/output count of said each of said plurality of jobs increases.

18. An execution prediction and control method according to claim 16, wherein:

said unit processing amount of said computer system is an average value of unit processing amounts of jobs which have been executed by said computer system.

19. An execution prediction and control method according to claim 18, wherein each of said unit processing amounts of jobs which have been executed by said computer system is a value obtained by dividing a processing amount of said each of said jobs, which is a sum of a consumed CPU time of said each of said jobs which have been executed and a consumed input/output time thereof, by an elapsed time required to execute said each of said jobs.

20. An execution prediction and control method according to claim 1, wherein said output means is a display means for displaying said target execution end times.

21. An execution prediction and control method according to claim 1, wherein:

said step b) includes a step of obtaining initially set CPU times, consumed CPU times, initially set input/output times, and wherein said step c) includes:

a step of obtaining a first difference between said initially set CPU time of said each of said plurality of jobs and said consumed CPU time of said each of said plurality of jobs, and obtaining a second difference between said initially set input/output time of said each of said plurality of jobs sand said issued input/output time of said each of said plurality of jobs, and a step of obtaining said predicted execution end time of said each of said plurality of jobs in accordance with a value which is obtained by dividing a processing amount of unexecuted portion of said each of said plurality of jobs, which is a sum of said first and second differences, by a unit processing amount of said computer system.

22. An execution prediction and control method according to claim 21, wherein:

said unit processing amount of said computer system is an average value of unit processing amounts of jobs of said plurality of jobs which have been executed by said computer system.

23. An execution prediction and control method according to claim 21, wherein:

said step c) includes a step of obtaining said initially set input/output time of said each of said plurality of jobs by multiplying an initially set input/output count of said each of said plurality of jobs by a unit input/output time of said each of said plurality of jobs, and wherein said unit input/output time of said each of said plurality of jobs decreases monotonously as said initially set input/output count of said each of said plurality of jobs increases.

24. An execution prediction and control means according to claim 21, further comprising:

a step of obtaining an average value of unit processing amounts of jobs of said plurality of jobs which have been executed by said computer system as said unit processing amount of said computer system, and a step of obtaining a predicted execution end time of each of unexecuted jobs of said plurality of jobs in accordance with a value which is obtained by dividing an initially set processing amount of said each said unexecuted jobs, which is a sum of an initially set CPU time said each of said unexecuted jobs and an initially set input/output time of said each of said unexecuted jobs, by said unit processing amount of said computer system obtained by said step of obtaining an average value.

25. An execution prediction and control method according to claim 21, further comprising:

a step of outputting said predicted execution end times of said jobs under execution and said predicted execution end times of said jobs which have been executed.

26. A job execution situation display and control method in a computer system having a CPU and a monitor, said computer system executing a plurality of jobs in parallel, comprising the computer-executed steps of:

obtaining target execution end times of said plurality of jobs, wherein said target execution end times are obtained from at least one of a user terminal, a calculated value, and an associated auxiliary storage device;

collecting information of historical data including run time data on respective processing amounts of said plurality of parallelly executed jobs during the execution thereof;

calculating, using said collected information of historical data, predicted execution end times of the respective jobs;

controlling subsequent processing speeds of the respective jobs in response to the predicted execution end times calculated for the respective jobs and target execution end times of the respective jobs to bring the predicted execution end times in better agreement with the target execution end times; and displaying on said monitor, a time chart showing the predicted execution end times calculated for the respective jobs and target execution end times specified for the respective jobs.

27. A job execution situation display and control method according to claim 26, wherein:

predicted execution times of a plurality of jobs which are scheduled to be executed later are calculated in accordance with the collected information;

predicted execution end times of a plurality of jobs which are scheduled to be executed subsequent to those jobs are calculated from specified execution start times and the calculated predicted execution times for the respective jobs; and the target execution end times specified for the plurality of jobs which are scheduled to be executed times calculated for these jobs are displayed on said time chart.

28. A job execution situation display and control method according to claim 26, wherein said step of controlling the processing speeds, when the predicted execution end time calculated for one of said jobs under execution is later than the target execution end time of said one job, increases the subsequent processing speed of said one job.

29. A job execution situation display and control method according to claim 26, wherein said step of controlling the processing speeds, when the predicted execution end time calculated for one of said jobs under execution is later than the target execution end time of said one job, sets the execution priority of said one job higher than the execution priorities of other jobs to thereby increase the processing speed of said one job.

30. A job execution situation display and control method in a computer system having a CPU and a display means, said computer system executing a plurality of jobs, comprising the computer-executed steps of:

collecting information of historical data including run time data on respective processing amounts of said plurality of parallelly executed jobs during the execution thereof;

calculating, using both current and previously collected and stored information of historical data, predicted execution times of said plurality of jobs;

calculating, from specified execution start times and calculated predicted execution times for the respective jobs of said plurality of jobs, predicted execution end times of said plurality of jobs which are executing;

controlling, using predicted execution end times calculated for the respective jobs and target execution end times of the respective jobs, subsequent processing speeds of the respective jobs;

displaying, on said display means, in a time chart, said target execution end times for said plurality of jobs and said predicted execution end times calculated for said plurality of jobs; and storing said information of historical data collected during the execution of said plurality of jobs for future scheduling use.

31. A job execution situation display and control method according to claim 30, wherein an execution end time of an executed job is displayed on said time chart.

32. An execution and prediction and control apparatus for a plurality of jobs executed in parallel in a computer system having a CPU, comprising:

means for obtaining target execution end times of said plurality of jobs to be executed in parallel, wherein said target execution end times are obtained from at least one of a user terminal, a calculated value, and an associated auxiliary storage device means for outputting the target execution end times to an output means;

means for collecting information of historical data inclusive of run time data on processing amounts of a plurality of jobs during execution of the respective jobs;

means for obtaining, using said collected information of historical value, predicted execution end times of jobs being executed;

means for comparing the predicted execution end times obtained for said plurality of jobs with the target execution end times of said plurality of jobs; and means for controlling, using the results of said comparisons, subsequent execution priorities of said plurality of jobs so that the target execution end times can be best achieved.

33. A job execution and prediction and control method in a computer system having a CPU, comprising the steps of:

obtaining target execution end times of a plurality of jobs to be executed in parallel and outputting the target execution end times to an output means;

collecting information on processing amounts of a plurality of parallelly executed jobs during execution of plurality of jobs;

calculating predicted execution end times of the plurality of jobs in accordance with the collected information; and controlling subsequent execution speeds of the plurality of jobs in accordance with the predicted execution end times calculated for the plurality of jobs and target execution end times of the plurality of jobs.

34. A job execution and prediction and control method according to claim 33, wherein said step of controlling the execution speeds, when the predicted execution end time calculated for one of said jobs under execution is later than the target execution end time of said one job, increases the subsequent execution speed of said one job.

35. A job execution and prediction and control method according to claim 33, wherein said step of controlling the execution speeds, when the predicted execution end time calculated for one of said jobs under execution is later than the target execution end time of said one job, sets the execution priority of said one job higher than the execution priorities of other jobs.

* * * * *